United States Patent [19]

Hayakawa

[11] Patent Number: 4,638,394
[45] Date of Patent: Jan. 20, 1987

[54] TAPE AMOUNT DISPLAYING APPARATUS

[75] Inventor: Masaharu Hayakawa, Nagaokakyo, Japan

[73] Assignee: Mitsubishi Denki Kabushiki Kaisha, Tokyo, Japan

[21] Appl. No.: 520,520

[22] Filed: Aug. 5, 1983

[30] Foreign Application Priority Data

Sep. 2, 1982 [JP] Japan .................. 57-154417

[51] Int. Cl.⁴ .................. G11B 15/18; G11B 19/06
[52] U.S. Cl. .................. 360/137; 360/72.3
[58] Field of Search .................. 360/72.1, 72.3, 137; 242/198–200

[56] References Cited

U.S. PATENT DOCUMENTS 4,092,680 5/1978 Sander .................. 360/72.3
4,471,391 9/1984 Reagan .................. 360/72.3

Primary Examiner—A. J. Heinz
Attorney, Agent, or Firm—Low Price Leblanc Becker & Shur

[57] ABSTRACT

A tape amount displaying apparatus displays a used amount of a tape or a remaining amount thereof. A signal corresponding to a length ($l_t$) of an outermost periphery of the tape wound in a reel is outputted from an outermost periphery length signal outputting circuit and then stored in a memory. Each time a one-turn detecting circuit detects one turn of the reel, the predetermined value ($2\pi d$) is added to the length of the outermost periphery read out from the memory if a rotational direction detecting circuit detects that the reel rotates in a predetermined direction, or the predetermined value ($2\pi d$) is subtracted from the outermost periphery length if the rotational direction detecting circuit detects that the reel rotates in the opposite direction. The result of such an addition or subtraction is again stored in the memory. The content stored in the memory is squared ($l_t^2$), and then a predetermined value ($4\pi^2 r_h^2$) is subtracted from the squared value ($l_t^2$) and, in addition, the result of the subtraction is divided by a predetermined value ($4\pi d$). As a result, a tape amount (Lt) is displayed in a display.

6 Claims, 3 Drawing Figures

TAPE AMOUNT DISPLAYING APPARATUS

BACKGROUND OF THE INVENTION

1. Field of the Invention

The present invention relates to a tape amount displaying apparatus. More particularly, the present invention relates to an improvement of a display apparatus for displaying an amount of a tape, such as a used amount of a magnetic tape or a remaining amount of the magnetic tape in a tape-recorder.

2. Description of the Prior Art

A conventional tape amount displaying apparatus in a tape-recorder has been adapted such that a rotational period of a reel is sequentially measured and the measured result is multiplied by a tape travelling speed so that the length of an outermost periphery of the tape wound in the reel is evaluated, and then the tape amount is calculated from the length of the outermost periphery of the tape and displayed. According to such conventional system, a remaining amount of the tape can be precisely displayed only if a tape travelling speed is constant in recording or reproducing, for example and constant rotational frequency can be measured. However, in fast-forwarding or rewinding a tape, a tape travelling speed changes depending on the amount of tape on a supply reel or a takeup reel and hence a constant rotational period of a reel can not be measured. In such a case, there is a disadvantage, that the tape amount can not be calculated and displayed.

In order to overcome such a disadvantage, the following approach can be considered. Particularly, there is provided a roller always in contact with a tape and an apparatus for measuring the rotational speed of the roller, so that a varying tape travelling speed is evaluated. Then, an average tape travelling speed in a predetermined time period is evaluated based on the varying tape travelling speed and the rotational frequency of the reel, so that the tape amount can be calculated. However, such an approach has a new problem in that the display apparatus thus structured becomes complicated and expensive.

SUMMARY OF THE INVENTION

A principal object of the present invention is to provide a tape amount displaying apparatus with a simplified structure and low cost, capable of displaying a precise tape amount all the time even if a tape travelling speed is not constant, e.g., in fast-forwarding or rewinding of a tape.

Briefly stated, the present invention is adapted such that an initial value corresponding to an outermost periphery length of a tape wound on a reel in advance is outputted and, each time the reel rotates, a predetermined value is added to or subtracted from the length of the outermost periphery of the tape so that the present or current outermost periphery length of the tape is calculated and, then, a current tape amount wound on the reel is calculated based on this value and is displayed.

Therefore, in accordance with the present invention, a precise tape amount can be displayed all the time, with relatively simple and inexpensive apparatus, even if the tape travelling speed is not constant, e.g., during fast-forwarding or rewinding of a tape.

In a preferred embodiment of the present invention, a signal representing the length of an outermost periphery of the tape is stored in a memory and a value corresponding to an increment or decrement of the outermost periphery of the tape caused for each one rotation of the reel is added to or subtracted from the outermost periphery length stored in the memory, so that, based on the contents stored in the memory, the tape amount is evaluated and displayed.

Accordingly, in accordance with the preferred embodiment of the present invention, the tape amount can be sequentially displayed since the data related to the tape amount varying depending on the travelling of the tape is stored in the memory while the data is calculated.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
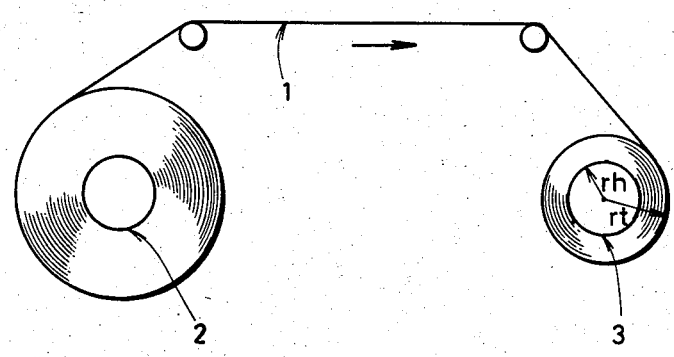
FIG. 1 is a schematic diagram for explaining a principle of the present invention.

FIG. 1 is a schematic diagram for explaining a principle of the present invention. First referring to FIG. 1, the principle of the present invention will be described.

As shown in FIG. 1, a magnetic tape 1 is taken up by a takeup reel 3 from the supply reel 2 in a tape-recorder. The total length $L_t$ of the tape 1 wound on the supply or takeup reel is evaluated in the following Equation (1).

$$Lt = \pi(r_t^2 - r_h^2)/d \qquad \text{Equation (1)}$$

wherein $r_t$ represents the radius from the center of the reel to the outermost periphery of the tape wound on the reel, $r_h$ represents the radius of the hub in the reel and d is the thickness of the tape 1.

Subsequently, for the purpose of simplification of explanation, an amount of the tape wound on the takeup reel 3 will be described.

Now, let the length of the outermost periphery of the tape 1 wound on the takeup reel 3 be $l_t$. Then, $r_t$ is evaluated in the following Equation (2).

$$r_t = l_t/2\pi \qquad \text{Equation (2)}$$

from the Equations (1) and (2). $L_t$ is represented by the following Equation (3).

$$Lt = \pi\{(l_t^2/4\pi^2) - r_h^2\}/d \qquad \text{Equation (3)}$$
$$= (l_t^2 - 4\pi^2 r_h^2)/4\pi d$$

Based on the Equation (3), the tape amount $L_t$ can be evaluated from the outermost periphery length $l_t$ of the tape assuming that the thickness of the tape d and the radius of the hub $r_h$ are known.

Next, if and when the tape 1 is taken up on the takeup reel 3 and the reel rotates once, a radius $r_t'$ from the center of the reel to the outermost periphery of the tape after such a single rotation is represented by the following equation (4).

$$r_t' = r_t + d \qquad \text{Equation (4)}$$

Then, the length $l_t'$ of the outermost periphery of the tape 1 wound on the takeup reel 3 is represented by the following equation (5).

$$l_t' = 2\pi r_t' = 2\pi(r_t + d) \qquad \text{Equation (5)}$$

From the equations (2) and (5), $l_t'$ is represented by the following equation (6).

$$l_t' = l_t + 2\pi d \qquad \text{Equation (6)}$$

Now, the whole length $L_t'$ of the tape 1 wound on the takeup reel 3 after one rotation of the takeup reel 3 can be evaluated by substituting $l_t'$ for $l_t$ in the Equation (3). More particularly, each time the takeup reel 3 rotates once, a correction of the Equation (6) is made and then the obtained $l_t'$ is substituted for $l_t$ in the Equation (3), so that a current tape amount on the takeup reel 3, and hence the, a current amount of the tape used, can be evaluated from the Equation (3). If and when the reel rotates in the opposite directuion, a subtraction is made instead of an addition in the Equation (6). In this case, the reel 3 becomes the supply reel and thus a remaining tape amount can be evaluated. In addition, each time a reel rotates n times (n is any integer), an operation may be made based on the following equation (7) instead of the Equation (6), so that the tape amount $L_t$ can be evaluated similarly.

$$l_t' = l_t + 2\pi nd, \text{ or } l_t - 2\pi nd \qquad \text{Equation (7)}$$

Figure 2:
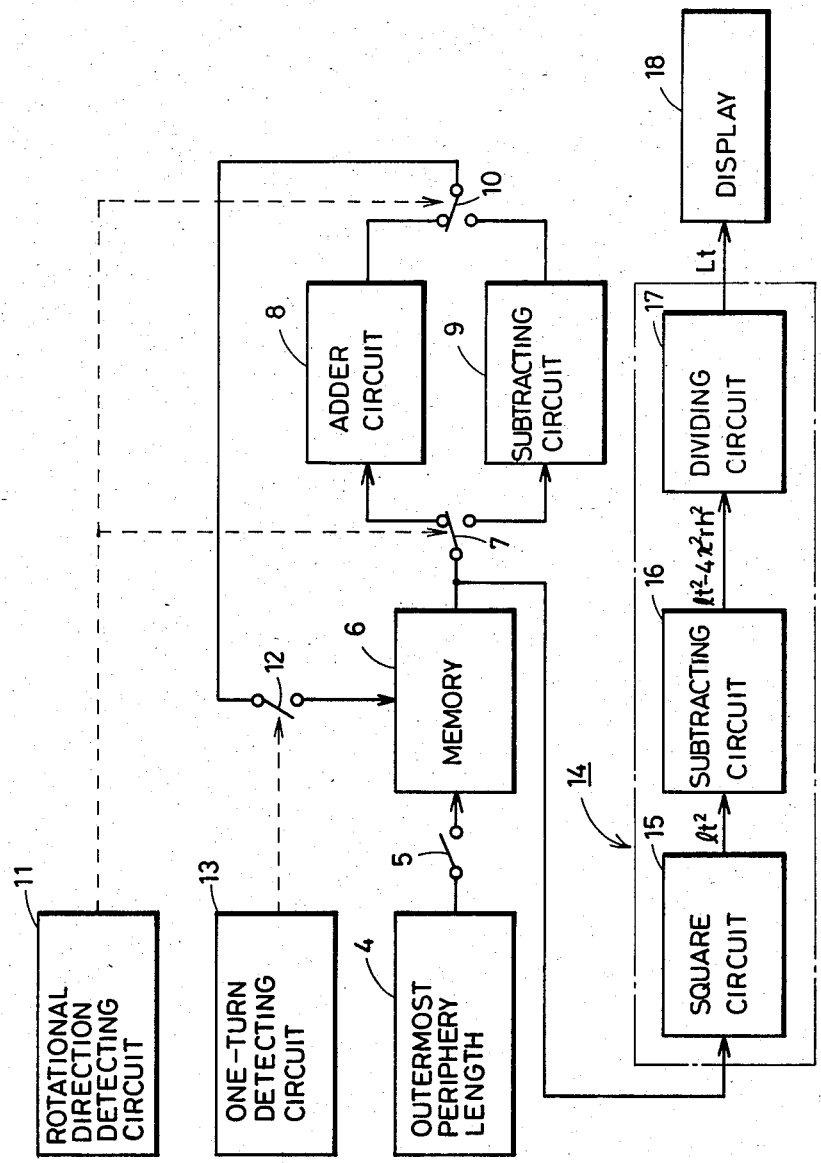
FIG. 2 is a schematic block diagram of an embodiment of the present invention.

FIG. 2 is a schematic block diagram of an embodiment of the present invention. First, referring to FIG. 2, a structure of an embodiment of the present invention will be described. An outermost periphery length indicating signal generating circuit 4 generates a digital signal corresponding to an outermost periphery length $l_t$ of the tape 1 wound on a takeup reel 3 in an initial state. The digital signal corresponding to the outermost periphery length $l_t$ may be a predetermined code which is generated by, for example, a plurality of switches. An output from the outermost periphery length indicating signal generating circuit 4 is applied to a memory 6 through a switch 5. The switching of a switch 5 is manually made after an operator of the tape-recorder visually confirms that the tape 1 is not wound on the takeup reel 3. However, the switching of the switch 5 may be made in response to an optical or magnetic detection of termination of rewinding of the tape 1.

The outermost periphery length indicating signal stored in the memory 6 is applied to an adder circuit 8 or a subtracting circuit 9 through a switch 7 and is also applied to an arithmetic circuit 14. An output from the adder circuit or the subtracting circuit 9 is applied to the memory 6 through selection switches 10 and 12. The selection switches 7 and 10 are switched, in an interlooking manner, to the adder circuit 8 or the subtracting circuit 9 based on the detection output from a rotational direction detecting circuit 11. More particularly, the rotational direction detecting circuit 11 detects that the takeup reel 3 rotates a clockwise direction or a counterclockwise direction in FIG. 1. Then, if and when the rotational direction detecting circuit 11 detects that the takeup reel 3 rotates in a clockwise direction, the switches 7 and 10 are switched to the adder circuit 8. If and when the detecting circuit 11 detects that the takeup reel 3 rotates a counter-clockwise direction, the switches 7 and 10 are switched to the subtracting circuit 9.

The switch 12 is switched in response to an output from a one-turn detecting circuit 13. More particularly, the one-turn detecting circuit 13 detects that the takeup reel 3 rotates one turn and thus the switch 12 is closed for each rotation of the takeup reel 3.

The arithmetic circuit 14 includes a square circuit 15, a subtracting circuit 16 and a dividing circuit 17 and calculates the tape amount $L_t$ based on the content stored in the memory 6 and makes the display 18 display the result.

Now, an operation will be described. If and when the switch 5 is closed, an outermost periphery length indicating signal $l_t$ from the outermost periphery length indicating signal generating circuit 4 is stored in the memory 6. If and when the rotational direction detecting circuit 11 detects, at that time, that the takeup reel 3 rotates in a clockwise direction in FIG. 1, the selection switches 7 and 10 are switched to the adder circuit 8. Then, the adder circuit 8 add a predetermined value ($2\pi d$) to the outermost periphery length $l_t$ stored in the memory 6 so that the above described Equation (6) is operated. Then, if and when the one-turn detecting circuit 13 detects one-turn of the takeup reel 3, the switch 12 is closed and thus the value $l_t'$ of the output from the adder circuit 8 is stored in the memory 6. The arithmetic circuit 14 performs an operation based on the above described Equation (4) by using the outermost periphery length $l_t'$ stored in the memory 6. More particularly, in the arithmetic circuit 14, the square circuit 15 first squares the outermost periphery length $l_t$ and then the subtracting circuit 16 subtracts a predetermined value ($4\pi^2 r_h^2$) from the squared value $l_t^2$ to provide the result of ($l_t^2 - 4\pi^2 r_h^2$) and the dividing circuit 17 divides the result from the subtracting circuit 16 by a value $4\pi d$, so that the tape amount $L_t$ is evaluated. Then, the final result is displayed in the display 18.

As described in the foregoing, each time the takeup reel rotates one turn, the value ($2\pi d$) is added to or subtracted from the outermost periphery length $l_t$ of the tape in an initial state stored in the memory 6, so that a renewed outermost periphery length for each turn is evaluated. Then, the arithmetic circuit 14 calculates the tape amount based on the renewed outermost periphery length $l_t$ and displays the same in the display 18. Accordingly, a tape amount is displayed in the display 18 each time a takeup reel 3 rotates one turn.

Figure 3:
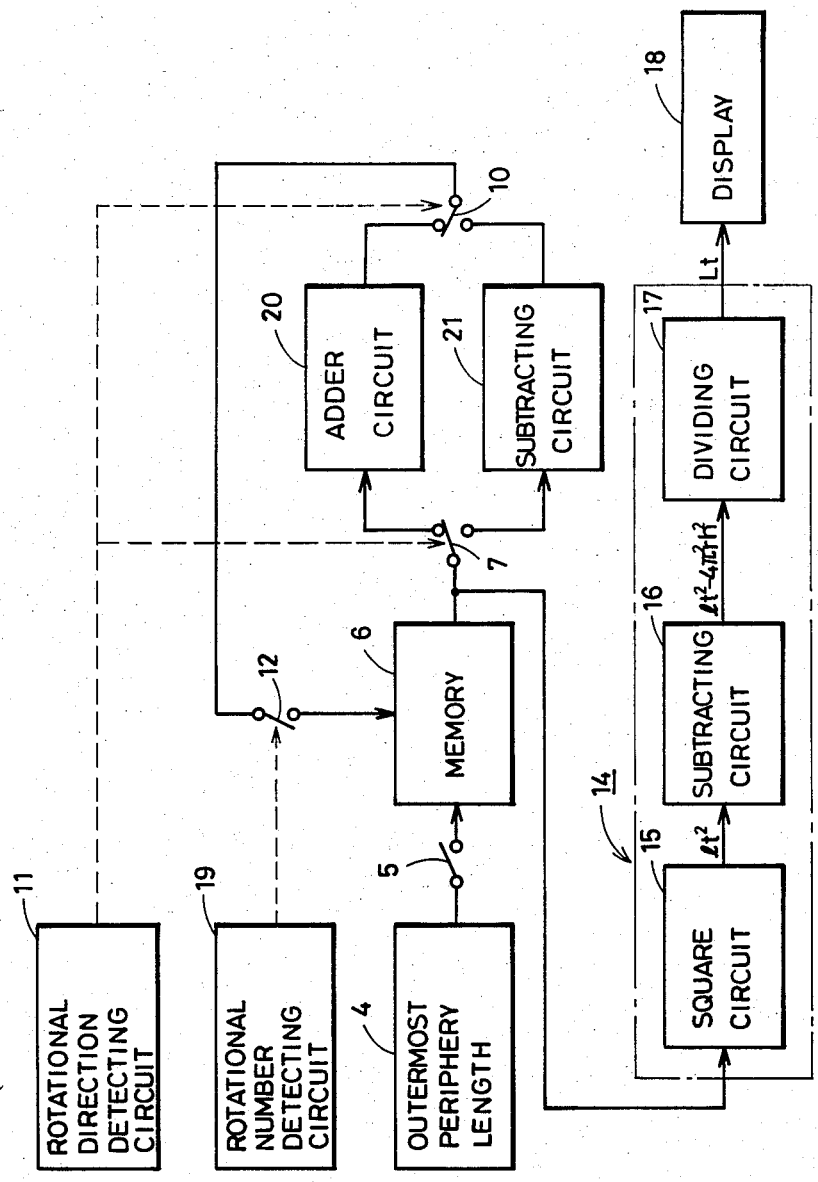
FIG. 3 is a schematic block diagram of another embodiment of the present invention.

FIG. 3 is a schematic block diagram showing another embodiment of the present invention. The embodiment shown in FIG. 3 is the same as that in FIG. 2 except for the following point. More particularly, a predetermined rotational number detecting circuit 19 is provided instead of a one-turn detecting circuit 13 shown in FIG. 2. The predetermined rotational number detecting circuit 19 detects that the takeup reel 3 rotates a predetermined number of turns and in response to such detection, the switch 12 is closed. In addition, an adder circuit 20 and a subtracting circuit 21 are provided instead of the adder circuit 8 and the subtracting circuit 9 in FIG. 2. The adder circuit 20 adds to an outermost periphery length $l_t$ *from the memory 6 a length* ($2\pi nd$) of the tape 1 taken up by the takeup reel 3 when the takeup reel 3 rotates a predetermined number of turns, n turns. The subtracting circuit 21 subtracts the value ($2\pi nd$) from the outermost periphery length $l_t$. Thus, the memory 6 stores the result of the addition of $2\pi nd$ to the outermost periphery length $l_t$ or of the subtraction of $2\pi nd$ from the length $l_t$ each time the takeup reel 3 rotates a predetermined number of turns, that is, n turns. Then, the arithmetic circuit 14 calculates the tape amount $L_t$ based on the contents stored in the memory 6 and makes the display 18 display the same.

As another example of the outermost periphery length indicating signal generating circuit 4 shown in FIGS. 2 and 3, an outermost periphery length $l_t$ of the tape 1 wound on the takeup reel 3 may be obtained by making the tape 1 travel at a predetermined constant speed, measuring a rotational period of the takeup reel 3 and then multiplying the obtained rotational period by the travelling speed of the tape 1 at that time. In this case, even if the tape 1 is already wound on the takeup reel 3, an increase or decrease of tape amount caused subsequently can be detected.

The amount of the used or remaining tape, as described above, is displayed in the above described embodiments. In addition, the spent time or remaining time period $T_t$ of the tape 1 in recording or reproducing the tape at a tape travelling speed V can be displayed since $T_t = L_t/V$ can be obtained by using, instead of the dividing circuit 17 included in the arithmetic unit 14, a dividing circuit in which the output from the subtracting circuit 16 is divided by $(4\pi dV)$.

In addition, although, in the above described embodiment, the tape amount on the side of takeup reel 3 is displayed, the tape amount on the supply reel 2 side may be displayed in the same manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tape amount displaying apparatus for displaying sequentially an amount of a tape of known thickness of d wound on a rotating reel with a tape winding hub of known radius $r_h$, comprising;

outermost periphery length indicating signal outputting means for outputting a signal indicating the length of the outermost periphery of said tape wound on said reel;

number of turns detecting means for detecting the number of turns n made by said reel;

rotational direction detecting means for detecting the direction of said rotation of said reel;

first arithmetic means, operative in synchronization with said output signal from said number of turns detecting means, for adding a predetermined value $2\pi nd$ from said signal from said outermost periphery length indicating signal outputting means, respectively according to whether said tape is wound on or off said rotating wheel, so that a current outermost periphery length $l_t$ of said tape is evaluated as a first evaluation result;

second arithmetic means for evaluating as a second evaluation result the current tape amount $L_t$ wound on said reel based on said first evaluation result from said first arithmetic means such that $L_t = (l_t^2 - 4\pi r_h^2)/4\pi d$; and displaying means for displaying said second evaluation result from said second arithmetic means.

2. A tape amount displaying apparatus in accordance with claim 1, wherein:

said first arithmetic means comprises storage means for storing a signal indicating the outermost periphery length in an initial state from said outermost periphery length indicating signal outputting means;

adding means for adding an increment of the outermost periphery length of said tape to the outermost periphery length stored in said storage means, when said rotational direction detecting means detects that said reel rotates in a first direction, subtracting means for subtracting a decrement of the outermost periphery length of said tape from the outermost periphery length stored in said storage means when said rotational direction detecting means detects that said reel rotates in a second direction, and means for allowing said storage means to store the output from said adding means or said subtracting means each time said rotational number detecting means detects the rotational direction and number of turns made by said reel.

3. A tape amount displaying apparatus in accordance with claims 2, wherein:

said number of turns detecting means comprises one-turn detecting means for detecting one turn of said reel and for outputting a corresponding detecting signal;

said adding means comprises an adder for adding to said outermost periphery length stored in said storage means an increment of the outermost periphery length of said tape corresponding to each turn of said reel, said subtracting means comprises a subtracter for subtracting a decrement of said outermost periphery length of said tape corresponding to each turn of said reel; and said means for allowing said storage means allows said storage means to store the result of said addition or subtraction, respectively corresponding to the direction of rotation of said reel, each time said one-turn detecting means outputs said detection signal.

4. A tape amount displaying apparatus in accordance with claim 2, wherein:

said number of turns detecting means comprises a predetermined number of turns detecting means for detecting that said reel rotates a predetermined number of turns;

said adding means comprises an adder for adding an increment of said outermost periphery length of said tape caused for each said predetermined number of turns of said reel;

said subtracting means comprises a subtracter for subtracting a decrement of said outermost periphery length of said tape caused for each said predetermined number of turns of said reel; and said means for allowing said storage means allows said storage means to store the value of said addition or subtraction, respectively corresponding to the direction of rotation of said reel, when said rotational number detecting means detects that said reel rotates a predetermined number of turns.

5. A tape amount displaying apparatus for displaying sequentially an amount of a tape of known thickness wound on a rotating reel having a hub of known radius, comprising:

reference outermost periphery length indicating signal outputting means for outputting a signal indicating the length $l_t$ of a reference outermost periphery of said tape of thickness d wound on said reel when said reel is in a reference position;

number of turns detecting means for detecting the number of turns n turned by said reel with respect to said reference position;

rotational direction detecting means for detecting the direction of rotation in which said reel makes said turns with respect to said reference position;

computation means for computing a length of tape $L_t$ wound on said reel hub of a radius $r_h$ when said reel is in said reference position such that $$L_t = (l_t^2 - 4\pi r_h^2)/4\pi d$$

and computing an additional length $2\pi d$ to be added or subtracted per turn made by said reel with respect to said reference position, in accordance with whether said direction of rotation is detected as being one which causes said tape to wind on or wind off said reel, to determine the corresponding length of tape wound on or wound off said reel due to said turning of said reel; and display means for displaying said signal.

6. A method of displaying an amount of a tape of known thickness d wound on a rotating reel having a hub of known radius $r_h$, comprising the steps of:

identifying a reference position of said reel;

determining the length of tape $l_t$ wound at the outermost periphery of said tape wound on said hub of said reel when said reel is in said reference position;

detecting the direction of rotation of said reel with respect to said position;

detecting the number of turns which said reel rotates in said direction;

determining the initial length of tape wound on said hub of said reel in said reference position, given by $$L_t = (l_t^2 - 4\pi r_h^2)/4\pi d$$

and determining a current length of tape on said reel by adding or subtracting from said initial length a length change per turn equal to ($2\pi d$), according to whether said detected direction of rotation causes tape to be wound on or wound off said reel; and displaying said current length of tape.

* * * * *